Patented June 1, 1954

2,680,135

UNITED STATES PATENT OFFICE 2,680,135

SULFONAMIDOPHENYLAMIDO -1,3- PROPANEDIOL COMPOSITIONS AND PROCESS

Walter A. Gregory, Wilmington, Del., assignor to E. I. du Pont de Nemours and Company, Wilmington, Del., a corporation of Delaware No Drawing. Application July 2, 1952,
Serial No. 296,959

8 Claims. (Cl. 260—556)

This invention relates to sulfonamidophenylamido-1,3-propanediols and to their preparation.

The sulfonamidophenylamido-1,3-propanediols of the invention are represented by the formula 1. 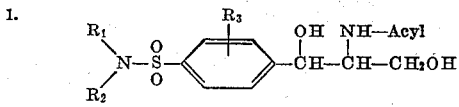

where $R_1$ and $R_2$ are the same or different and represent hydrogen, lower alkyl and hydroxyethyl, $R_3$ is hydrogen, halogen, lower alkyl or lower alkoxy radicals, and acyl represents a radical such as acetyl, chloroacetyl, bromoacetyl, dichloroacetyl and dibromoacetyl and like radicals.

The terms "lower alkyl" and "lower alkoxy" as used herein include all alkyl and alkoxy radicals containing not more than six carbon atoms.

Illustrative of the sulfonamidophenylamido-1,3-propanediols of the invention are:

1 - (p-dimethylsulfamylphenyl) -2- (alpha,alpha-dichloroacetamido) -1,3-propanediol,
1- (p-diethylsulfamylphenyl) - 2 - (alpha,alpha-dichloroacetamido) -1,3-propanediol,
1- (p-dipropylsulfamylphenyl) - 2 - (alpha,alpha-dichloroacetamido) -1,3-propanediol,
1 - (p-sulfamylphenyl) -2- (alpha,alpha-dichloroacetamido) -1,3-propanediol,
1- (p-methylsulfamylphenyl) - 2 - (alpha,alpha-dichloroacetamido) -1,3-propanediol,
1- (p-ethylsulfamylphenyl) - 2 - (alpha,alpha-dichloroacetamido) -1,3-propanediol,
1-{p-[N,N-bis(2-hydroxyethyl) sulfamyl]phenyl}-2-(alpha,alpha-dichloroacetamido) - 1,3 - propanediol,
1-{p-[N - (2 - hydroxyethyl) sulfamyl]phenyl}-2-(alpha,alpha-dichloroacetamido) -1,3-propanediol,
1 - (4 - dimethylsulfamyl - 3 - methylphenyl) -2-(alpha,alpha-dichloroacetamido) -1,3-propanediol,
1 - (3 - chloro - 4 - dimethylsulfamylphenyl) -2-(alpha,alpha-dichloroacetamido) -1,3-propanediol,
1 - (2 - bromo - 4 - dimethylsulfamylphenyl) -2-(alpha,alpha-dichloroacetamido) -1,3-propanediol,
1 - (2-fluoro-4-sulfamylphenyl) -2- (alpha,alpha-dichloroacetamido) -1,3-propanediol,
1 - (2 - ethyl - 4 - dimethylsulfamylphenyl) - 2-(alpha,alpha-dichloroacetamido) -1,3-propanediol,
1 - (2 - methoxy - 4 - sulfamylphenyl) -2-(alpha,-alpha-dichloroacetamido) -1,3-propanediol,
1- (p-sulfamylphenyl) - 2 - acetamido -1,3-propanediol,
1 - (p - sulfamylphenyl) - 2 - (alpha-chloroacetamido) -1,3-propanediol,
1-(p-methylsulfamylphenyl) - 2 - (alpha,alpha-dibromoacetamido) -1,3-propanediol,
1- (p-methylsulfamylphenyl) - 2 - (alpha-bromoacetamido) -1,3-propanediol.

The compounds of the invention can be prepared from previously known organic compounds by novel syntheses which I have discovered. In these syntheses there are involved a number of new intermediate organic compounds.

Certain of these new intermediate compounds and all of the compounds represented by Formula 1 may exist in optical isomeric form. Stereoisomeric forms as used herein refer to the spatial arrangement of the polar groups on the two asymmetric carbon atoms with reference to erythrose and threose. To differentiate between these two possible forms the diastereoisomeric pair related to erythrose in configuration will hereinafter be designated as the erythro series and the diastereoisomeric pair related to threose as the threo series or form.

To further designate the threo form of the compounds of my invention I have designated as the threo form the major product obtained from the aluminum isopropoxide, isopropyl alcohol reduction of the ketones of the formula 2. 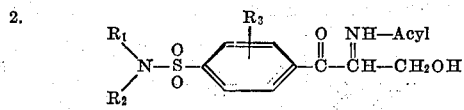

where $R_1$, $R_2$, $R_3$ and acyl have the same significance as in Formula 1.

Both the threo and erythro forms exist as racemates of optically active dextro (d) and levo (l) rotatory isomers as well as in the form of the individual or separated dextro (d) and levo (l) optical isomers.

In view of the difficulty of representing the various optical isomers with plane formulas, I have used the customary structural formulas and adapted the following convention in order to designate their optical configuration, and appropriate notation is used under the formula, for example, (l)-threo form, (d)-threo form, (l)-erythro form, (d)-erythro form, (dl)-threo form and the like.

It will be understood that where no notation appears with a structural formula or with a chemical name the formula or name is to be interpreted in its generic sense; that is, as representing the (d)-threo, (l)-threo isomers or (d)-erythro, (l)-erythro isomers in separated form as well as the (dl)-threo or (dl)-erythro optical racemates or the mixture of all the isomers and racemates. In other words, a formula or name represents not only the unresolved mixture of isomers but also the individual isomers and racemates.

The compounds of the invention are prepared by reacting a nitrogen-containing compound of the formula

3.

where $R_1$ and $R_2$ have the same significance as in Formula 1 with a fluorosulfonylphenylamido-1,3-propanediol having the formula

4.

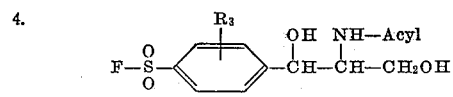

where $R_3$ and Acyl have the same significance as in Formula 1.

The fluorosulfonylphenylamido-1,3-propanediols used in the preparation of the compounds of the invention and represented by Formula 4 are fully described and claimed in my copending application Serial No. 296,960, filed concurrently herewith. The preparation of the fluorosulfonylphenylamido-1,3-propanediols is also described and claimed in this same copending application Serial No. 296,960.

In brief, the fluorosulfonylphenylamidopropanediols are prepared from p-fluorosulfonylacetophenone or related compounds of the formula

5.

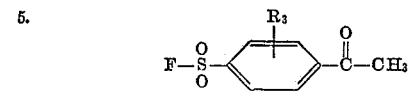

The synthesis involves the following sequence of steps: halogenation, addition of hexamethylenetetramine, treatment with $SO_2$ and water, HCl treatment, acylation, treatment with formaldehyde in the presence of a weak base, and a Meerwein-Ponndorf-Verly reduction or alternatively a $NaH_4B$ reduction.

Compounds represented by Formula 5 are readily available from either of two types of chemical structures, namely,

6.

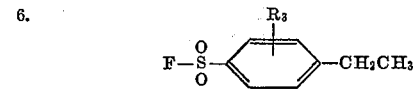

or

7.

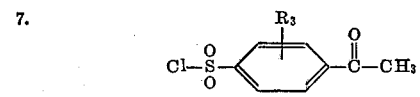

Potassium permanganate and magnesium nitrate may be used to convert a compound of Formula 6 to a compound of Formula 5. Compounds of Formula 7 can be converted to those of Formula 5 by use of potassium fluoride and water.

The reaction between the nitrogen-containing compound of Formula 3 and the fluorosulfonylphenylamido-1,3-propanediol of Formula 4 is preferably carried out by suspending the diol in the nitrogen-containing compound of Formula 3. The reactants are then thoroughly mixed for a period of, say, about 30 minutes, or until solution is completed. The resulting mixture may then be concentrated, or diluted with water, to yield—after the excess base has been neutralized with acid—the desired product.

An alternative route, which is particularly well suited for preparing phenylamido-1,3-propanediols substituted on the phenyl ring with a dialkyl sulfonamide group, can be diagrammatically represented as follows:

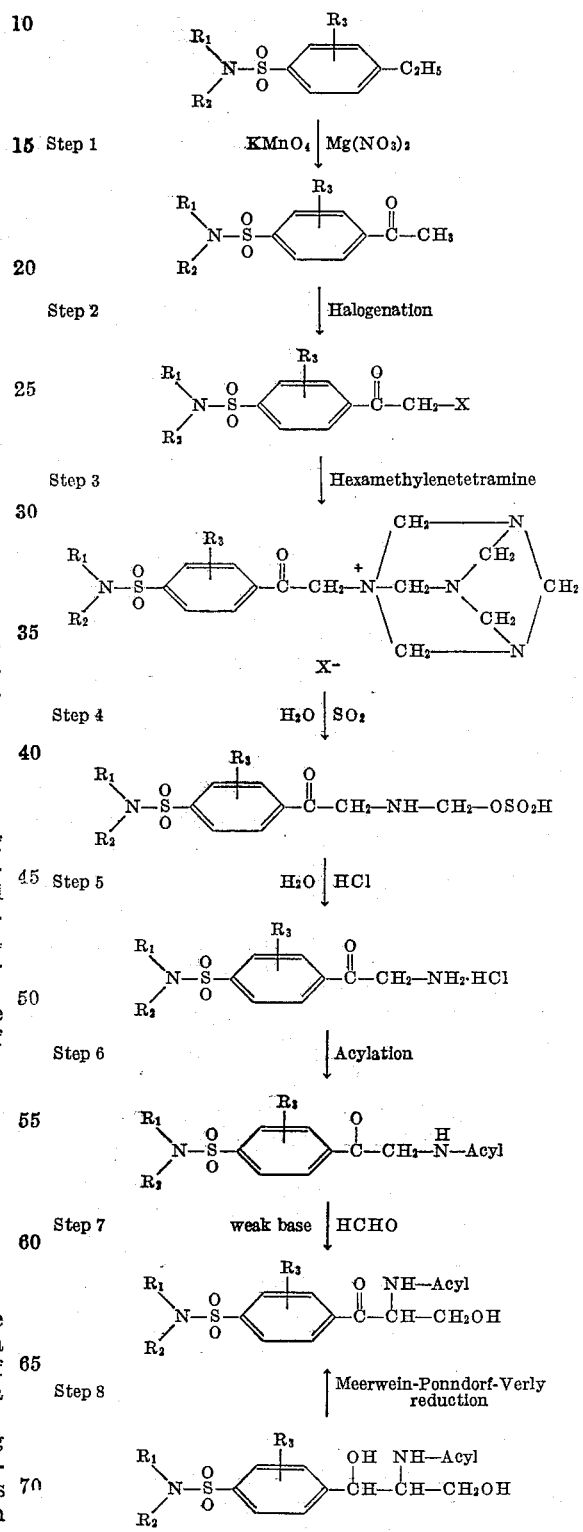

where $R_1$, $R_2$, $R_3$ and acyl have the same significance as in Formula 1 and X represents a chloro, bromo or iodo radical.

Step 1 of this alternative process involves converting a compound of the formula

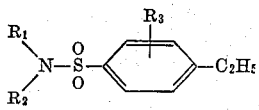

to an acetophenone of the formula

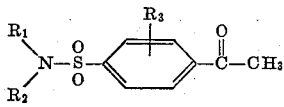

using potassium permanganate and magnesium nitrate hexahydrate. The resulting substituted acetophenone is halogenated in step 2, preferably in glacial acetic acid, to yield a compound having the formula

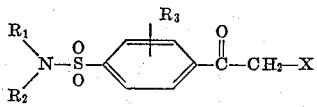

In the third step of my process, the alpha-halogen substituted acetophenone of the formula shown in the preceding paragraph is mixed in a liquid medium such as, for instance, anisole, with hexamethylenetetramine to yield a hexamethylenetetraminium halide of formula

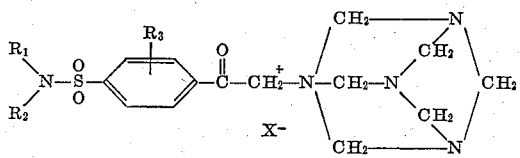

In most instances I have found it preferable to proceed directly to the sulfite without isolation of the hexamethylenetetraminium halide using sulfur dioxide and water as shown on the diagram as step 4. The substituted sulfamylacetophenone sulfite resulting from step 4 can be readily converted into the substituted sulfamylacetophenone hydrochloride using hydrochloric acid (step 5).

Step 6 comprises N-acylating the amine hydrochloride compound of step 5. This step is preferably carried out using dichloroacetyl chloride but similar acid halides or acetic anhydride in the presence of a weak base, for instance, sodium acetate, may be used.

The amide derivative produced in accordance with step 6 of my process is then subjected to an aldol type of condensation to yield a compound having the formula

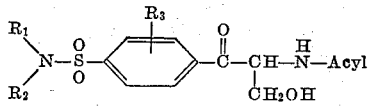

This condensation is preferably carried out in an alcoholic medium, for example, 95% ethanol or methanol, using sodium bicarbonate, or potassium carbonate, and an aqueous formaldehyde of 36–38% concentration.

Step 8, the final step in the process, involves a reduction of the carbonyl group of the compound produced in step 7 to a hydroxyl group. This reduction is effected in excellent yields using the Meerwein-Ponndorf-Verly reduction method as described by A. L. Wilds on page 203 of chapter 5 of "Organic Reactions," volume 2, John Wiley & Sons, Inc., N. Y. (1944). The product of step 7 and aluminum isopropoxide in isopropyl alcohol are thoroughly agitated to insure high yields. This method of reduction gives mainly $(dl)$-threo form of the sulfamylphenyl-2-amido-1,3-propanediols of my invention.

The individual threo stereoisomeric form of the sulfamylphenyl - 2 - amido - 1,3 - propanediol compounds can be resolved into their optical isomers following the syntheses of the compounds and conversion to the free amine. This resolution can be carried out by forming an acid salt of the racemic amine of threo form with an optically active acid such as, for instance, $(d)$-camphor sulfonic acid, $(l)$-camphor sulfonic acid, $(d)$-tartaric acid, $(l)$-tartaric acid, $(d)$-mandelic acid and $(l)$-mandelic acid; separating the two diastereoisomeric products by recrystallization from a solvent such as, for instance, a lower aliphatic alcohol or mixtures of the same with water or other organic solvents; and then regenerating the individual optically active isomers from the separated diastereoisomeric addition salts by treating each one separately with caustic or with a basic ion exchange resin.

When carrying out the resolution, as set forth above, it is desirable but not essential to choose the form of the optically active acid so that the diasterioisomer of which the desired optical isomer is a part will separate from the crystallization solution first.

It is understood that in those instances in which a $(l)$-threo-1-(p-fluorosulfonylphenyl)-2-amido-1,3-propanediol or a $(d)$-threo-1-(p-fluorosulfonylphenyl)-2-amido-1,3-propanediol is reacted with a nitrogen-containing compound of Formula 3 to produce a compound of this invention, the corresponding $(l)$-threo or $(d)$-threo sulfamylphenylamidopropanediol is obtained.

The compounds of the present invention are useful as drugs in the control of bacterial and rickettsial infections. They are also useful as nutritional supplements for livestock such as chickens, sheep, hogs and cattle.

In order to more fully understand the invention, reference should be had to the following illustrative examples:

EXAMPLE 1

*Preparation of $(dl)$ - threo - 1 - (p - dimethylsulfamylphenyl) - 2 - (alpha,alpha - dichloroacetamido) -1,3-propanediol*

p-Dimethylsulfamylethylbenzene is prepared according to the following procedure:

To a stirred solution of 640 g. of dimethylamine in 2 l. of water at 10° C. there is added 990 g. of p-ethylbenzenesulfonyl chloride. The temperature of the reaction mixture is kept between 10–15° C. during the chloride addition. At the end of the addition the temperature of the mixture is raised to 40° C. and maintained there for a period of one-half hour. The resulting solution is cooled and then extracted with chloroform. The chloroform extract is distilled. The product, p - dimethylsulfamylethylbenzene, is collected at a temperature of from 178–180° C. at 10 mm. pressure. It is a white crystalline solid melting 49–51° C.

The yield of p-dimethylsulfamylethylbenzene is 864 g. and has the formula shown below:

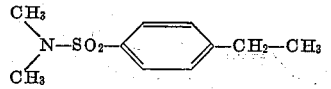

A solution of 800 g. of p-dimethylsulfamylethylbenzene in 9.5 l. of acetone is added to a mixture consisting of 570 g. of potassium permanganate and 1530 g. of magnesium nitrate hexahydrate in 9.5 l. of water warmed to a temperature of 50° C. The reaction mixture is stirred at a temperature of 50° C. for a period of two hours. Then an additional 220 g. of potassium permanganate is added. The reaction is allowed to continue for three hours. The excess permanganate is reduced by adding sodium sulfite until the filtered solution is colorless. The manganese dioxide is removed by filtering the solution with the use of Celite Filter Aid. The filtrate, which is separated as a semi-crystalline mass, amounts to 794 g. The product can be purified by successive crystallizations from carbon tetrachloride or benzene, or it may be distilled under reduced pressure. A substantial quantity of unoxidized starting material is recovered. The product, p-dimethylsulfamylacetophenone, is a white crystalline solid melting 102–103° C., and has the following structural formula:

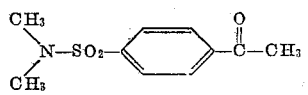

Anal. calcd. for $C_{10}H_{13}NO_3S$: C, 52.84; H, 5.76 N, 6.16. Found: C, 52.79; H, 5.88; N, 6.07.

A solution of 261 g. of p-dimethylsulfamyl-acetophenone in 1.5 l. of glacial acetic acid is stirred at a temperature of 17–20° C. as 183.8 g. of bromine is added. An initial induction period is required for the bromination to start. This varies from 15 minutes to several hours. After the solution decolorizes, the bromine is added dropwise over a period of two hours. The resulting mixture is then poured into 5 l. of ice and water. The product separates as an oil, which soon crystallizes. The product amounts to 349 g. and has a melting range of 75–80° C. After the crude product is recrystallized twice from benzene, 244 g. of white crystalline material is obtained. M. P. 90–92° C. Additional product is recoverable from the filtrate.

The product, alpha-bromo-p-(dimethylsulfamyl)-acetophenone, has the following structural formula:

Anal. calcd. for $C_{10}H_{12}BrNO_3S$: Br, 26.01. Found: Br, 25.91.

A solution of 244 g. of alpha-bromo-p-(dimethylsulfamyl)acetophenone in 1 liter of anisole is stirred at normal room temperature as 112.2 g. of hexamethylenetetramine is added. The temperature of the reaction mixture rises to 41° C. and the stirring is continued for a period of two hours. The anisole slurry is then poured into 3 l. of ice water to which 600 g. of sulfur dioxide has been added. After a period of 15 minutes, the slurry is filtered, and the solid is collected and washed with absolute ethanol and ether. A yield of 196 g. of a white powdery product is obtained. A further 135 g. of product separates from the filtrate on evaporation. The product, alpha - (hydroxymethylamino) - p-dimethylsulfamylacetophenone sulfite, has the following formula:

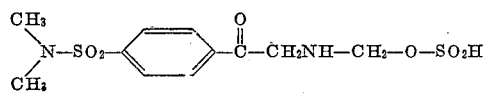

A suspension of 197 g. of alpha-(hydroxymethylamino) - p - (dimethylsulfamyl)acetophenone sulfite in a solution consisting of 197 cc. of concentrated hydrochloric acid and 394 cc. of absolute ethanol is stirred and refluxed for a period of 30 minutes. Sulfur dioxide is evolved and a substantial portion of the solid dissolves. The hot solution is filtered to remove any ammonium chloride present. On cooling the filtrate, crystals appear. They are collected on a filter, washed with ether and dried. A further quantity of product is obtained by concentrating the filtrate. A total yield of 135 g. of light tan needles is obtained. The product is alpha-amino-p-(dimethylsulfamyl)-acetophenone hydrochloride and has the structure:

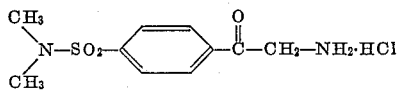

A suspension of 130 g. of alpha-amino-p-(dimethyl-sulfamyl) acetophenone hydrochloride in 360 cc. of freshly distilled dichloroacetyl chloride is stirred as the temperature of the suspension is raised to reflux. Hydrogen chloride is rapidly evolved and the solid dissolves. After refluxing the solution for a period of 30 minutes, the solution is cooled. The product is filtered, collected and washed with benzene and ether. The yield of product is 148 g. and has a melting point of 192–195° C. After two recrystallizations of the crude product from acetonitrile, 127 g. of white crystalline material is obtained. M. P. 196–198° C. This material is alpha,alpha-dichloro-N-(p-dimethylsulfamylphenacyl)acetamide. Its formula is:

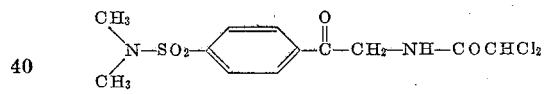

Anal. calcd. for $C_{12}H_{14}Cl_2N_2O_4S$: N, 7.93. Found: N, 7.79.

A suspension of 72.6 g. of alpha,alpha-dichloro-N - (p - dimethylsulfamylphenacyl)acetamide in 320 cc. of 95% ethanol containing 1.0 g. of potassium carbonate and 25.6 cc. of 36% aqueous formaldehyde is stirred at a temperature of 35–37° C. for a period of four hours. The warm solution is filtered free of a trace of unreacted material, and the filtrate made acid by adding dilute hydrochloric acid. The filtrate is diluted with 1 liter of benzene and concentrated under reduced pressure. The product crystallizes and the crystals are collected and washed with benzene. A yield of 34 g. of white crystalline product (M. P. 90–100° C.) is obtained. A further quantity of 38 g. of crude material is obtained by diluting the filtrate with benzene and concentrating further. The product is a solvate of alpha,alpha-dichloro-N-[2 - hydroxy-1-(p - dimethylsulfamylbenzoyl) ethyl]-acetamide and is used in the next step of the preparation without further purification.

To a stirred solution of 25 g. of aluminum isopropoxide in 150 cc. of isopropyl alcohol there is added as a warm solution 34 g. of alpha,alpha-dichloro-N-[2 - hydroxy-1-(p - dimethylsulfamylbenzoyl)ethyl]acetamide solvate in 100 cc. of hot isopropyl alcohol. The resulting mixture is refluxed with stirring beneath a packed distilling column. Isopropyl alcohol as well as acetone is slowly taken from the top of the column. In the solution remaining in the distilling vessel a yellow gum forms. At the end of a three hour period this mixture of liquor and gum is cooled in an ice bath. The isopropyl alcohol is decanted from the resulting solid and gum. The residue is triturated with 200 cc. of 5% hydrochloric acid, and the product crystallizes from the solution.

The yield of light tan crystalline product is 26 grams, M. P. 152–164° C. After two recrystallizations from acetonitrile, the (dl)-threo-1-(p-dimethylsulfamylphenyl) - 2 - (alpha,alpha - dichloroacetamido) - 1,3-propanediol thus obtained is white and crystalline and has a melting point of 174–176° C. It has the following chemical analysis:

Anal. calcd. for $C_{13}H_{18}Cl_2N_2O_5S$: C, 40.52; H, 4.70; N, 7.27. Found: C, 40.58; H, 4.74; N, 7.19.

(dl) - threo-1-(p - dimethylsulfamylphenyl)2-(alpha,alpha-dichloroacetamido) - 1,3-propanediol has shown substantial curative activity against Klebsiella pneumoniae infection in mice.

EXAMPLE 2

Preparation of (dl)-threo-1-(p-diethylsulfonylphenyl)-2 - (alpha,alpha-dichloroacetamido) - 1,3-propanediol

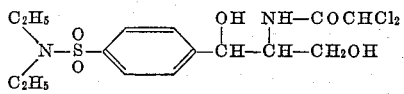

A suspension of 1 g. of (dl)-threo-1-(p-fluorosulfonylphenyl)-2 - (alpha,alpha - dichloroacetamido)-1,3-propanediol in 3 cc. of diethylamine is stirred for 30 minutes. The mixture is diluted with 50 cc. of ice water and made acid with dilute hydrochloric acid. A solid separates. It is collected on a filter and washed with water. The product, if desired, may be crystallized from acetonitrile.

EXAMPLE 3

Preparation of (dl) - threo-1-(p - dimethylsulfamylphenyl) - 2 - (alpha,alpha - dichloroacetamido)-1,3-propanediol

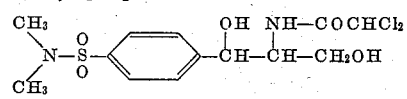

A 0.5 g. portion of (dl)-threo-1-(p-fluorosulfonylphenyl) - 2 - (alpha,alpha - dichloroacetamido) - 1,3 - propanediol in 3.5 cc. of dimethylcarbamate dimethylamine salt is stirred until the solid has dissolved. After the reaction mixture is allowed to stand for a period of 30 minutes, the resulting solution is poured into 66 cc. of ice water, and the base neutralized by adding dilute hydrochloric acid. White crystals separate. These are filtered off, collected, and washed with water. The yield is 0.4 g., M. P. 172–173° C. After crystallizing the product from acetonitrile, it has a melting point of 174–176° C.

EXAMPLE 4

Preparation of (dl)-threo-1-(p-sulfamylphenyl)-2-(alpha,alpha - dichloroacetamido)-1,3 - propanediol

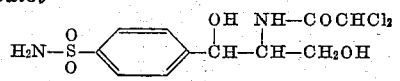

A suspension of 0.50 g. of (dl) - threo - 1 - (p-fluorosulfonylphenyl) - 2 - (alpha,alpha - dichloroacetamido)-1,3-propanediol in 5 cc. of concentrated aqueous ammonia is stirred until solution is complete. The solution is allowed to stand for about an hour. It is then concentrated under reduced pressure and made acid with dilute hydrochloric acid. The product separates as an oil which crystallizes on standing. It may be recrystallized from acetonitrile.

EXAMPLE 5

Preparation of (dl)-threo-1-(p-methylsulfamylphenyl) - 2-(alpha,alpha-dichloroacetamido) - 1,3-propanediol

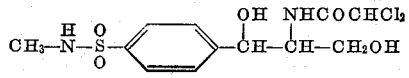

1 g. of (dl)-threo-1-(p-fluorosulfonylphenyl) - 2 - (alpha,alpha - dichloroacetamido) - 1,3 - propanediol is suspended in 5 cc. of 25% aqueous methylamine. The suspension is stirred until solution is complete. A bright yellow solution forms, and on standing crystals separate and the color fades.

After the solution has stood for a period of 30 minutes, the solution is poured into 50 g. of ice and water. The aqueous solution is acidified with 15% hydrochloric acid. The crystals are collected and dried. The yield of product, which is in the form of white prisms, is 0.45 g. (M. P. 173.7–175.0° C.). The crude product is crystallized from 5 cc. of acetonitrile to give 0.30 g. of product having a melting point of 175–176° C. A further quantity of product can be isolated from the water.

EXAMPLE 6

Preparation of (d)-threo-1-(p-dimethylsulfamylphenyl)-2 - (alpha,alpha-dichloroacetamido)-1,3-propanediol

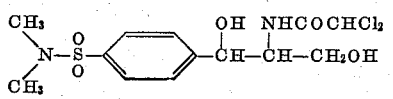

(d)-threo form

The intermediate compound in this synthesis, (dl) - threo - 1 - (p-dimethylsulfamylphenyl)-2-amino-1,3-propanediol is prepared according to the following procedure:

A suspension of 50 g. of (dl)-threo-1-(p-dimethylsulfamylphenyl) - 2 - (alpha,alpha - dichloroacetamido)-1,3-propanediol in 1 liter of 1.0 N hydrochloric acid is heated on a steam bath for a period of three hours. The resulting solution is cooled to a temperature of 25° C. and passed thru a column of basic ion exchange resin (IRA-400) to remove the anions. After removal of the anions, the solution is concentrated under reduced pressure to give a residue which crystallizes on dilution with ethanol. This crystalline product has the structural formula

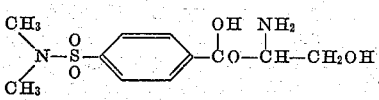

A solution of 27.4 g. of (dl)-threo-1-(p-dimethylsulfamylphenyl) - 2 - amino - 1,3 - propanediol in 70 cc. of warm isopropyl alcohol is stirred as 23.2 g. of d-camphorsulfonic acid dissolved in 50 cc. of isopropyl alcohol is added. The resulting solution is diluted with ether causing crystals to separate. The crystalline product is collected and fractionally crystallized from butanol to give the two diasterioisomeric salts, the (ld)-salt and the (dd)-salt.

10 g. of the (d)-camphorsulfonate salt of the (d) base is dissolved in 50 cc. of water and passed over an ion exchange column of IRA-400 basic ion exchange resin on the basic cycle. The aqueous effluent and washings are concentrated to give (d) - threo - 1 - (p - dimethylsulfamyl-phenyl)-2-amino-1,3-propanediol.

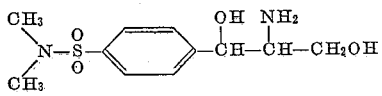

A mixture of 2 g. of (d)-threo-1-(p-dimethyl-sulfamylphenyl)-2-amino-1,3-propanediol, 1 g. of methyl dichloroacetate and 15 cc. of methanol is refluxed for a period of three hours. The methanol and excess methyl dichloroacetate are removed under reduced pressure from the reaction product. The product, which is (d)-threo isomer of 1 - (p - dimethylsulfamylphenyl) - 2-(alpha,alpha - dichloroacetamido) - 1,3 - propanediol, is purified by crystallization from acetonitrile.

EXAMPLE 7

*Preparation of (l)-threo-1-(p-dimethylsulfamyl-phenyl)-2 - (alpha,alpha - dichloroacetamido) - 1,3-propanediol*

10 g. of the (d)-camphorsulfonate salt of the (l) base as obtained in Example 6 is dissolved in 50 cc. of water and passed thru an ion exchange column containing IRA-400 basic ion exchange resin on the basic cycle. The salt is washed thru the column with distilled water. The aqueous effluent and washings are concentrated to give (l)-threo-1-(p-dimethylsulfamyl-phenyl)-2-amino-1,3-propanediol. Its formula is as follows:

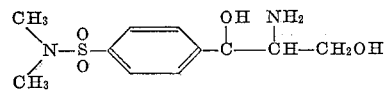

A mixture consisting of 2 g. of (l)-threo-1-(p - dimethylsulfamylphenyl) - 2 - amino - 1,3-propanediol, 1 g. of methyl dichloroacetate and 15 cc. of methanol is refluxed for a period of three hours. The methanol and excess methyl dichloroacetate are removed from the desired product by concentration under reduced pressure. The product is crystallized from acetonitrile.

EXAMPLE 8

*Preparation of (d)-threo-1-(p-sulfamylphenyl)-2 - (alpha,alpha - dichloroacetamido) - 1,3-propanediol*

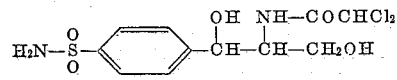

(d) threo form 1 g. of (d)-threo-1-(p-fluorosulfonylphenyl)-2 - (alpha,alpha - dichloroacetamido) - 1,3 - propanediol is added to 5 cc. of dioxane saturated with anhydrous ammonia. The resulting solution is allowed to stand for a period of one hour, and is then warmed under reduced pressure to remove excess ammonia and dioxane. The desired product crystallizes from the solution as the ammonia and dioxane are removed from the system. The product is recrystallized from acetonitrile.

EXAMPLE 9

*Preparation of (l)-threo-1-(p-sulfamylphenyl)-2 - (alpha,alpha - dichloroacetamido) - 1,3-propanediol*

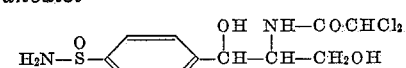

(l) threo form 1 g. of (l)-threo-1-(p-fluorosulfonylphenyl)-2-(alpha,alpha-dichloroacetamido)-1,3-propanediol is added to 5 cc. of dioxane saturated with anhydrous ammonia. The resulting solution is allowed to stand one hour, and is then warmed under reduced pressure to remove excess ammonia and dioxane. The desired product thus obtained crystallizes and is further purified by crystallization from acetonitrile.

I claim:
1. A compound of the formula,

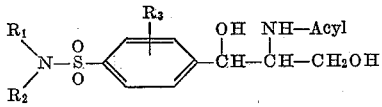

where $R_1$ and $R_2$ are members of the class consisting of hydrogen, lower alkyl and hydroxyethyl radicals, $R_3$ is a member of the class consisting of hydrogen, halogen, lower alkyl and lower alkoxyl radicals, and acyl is a member of the group consisting of acetyl, chloroacetyl, bromoacetyl, dichloroacetyl and dibromoacetyl radicals.

2. (dl) - threo - 1 - (p - dimethylsulfamyl-phenyl) - 2 - (alpha,alpha - dichloroacetamido)-1,3-propanediol.

3. (dl) - threo - 1 - (p - sulfamylphenyl)-2-(alpha,alpha - dichloroacetamido) - 1,3 - propanediol.

4. (dl) - threo - 1 - (p - methylsulfamylphenyl) - 2 - alpha,alpha - dichloroacetamido) - 1,3-propanediol.

5. (d) - threo - 1 - (p - sulfamylphenyl) - 2-(alpha,alpha - dichloroacetamido) - 1,3 - propanediol.

6. (l) - threo - 1 - (p - sulfamylphenyl) - 2-(alpha,alpha - dichloroacetamido) - 1,3 - propanediol.

7. A process which comprises the step of mixing a compound of the formula

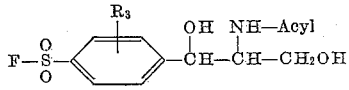

where $R_3$ is a member of the class consisting of hydrogen, halogen, lower alkyl and lower alkoxy radicals and acyl is a member of the group consisting of acetyl, chloroacetyl, bromoacetyl, dichloroacetyl and dibromoacetyl radicals, with a nitrogen-containing compound of the formula

where $R_1$ and $R_2$ are members of the class consisting of hydrogen, lower alkyl and hydroxyethyl radicals, whereby a compound of the formula

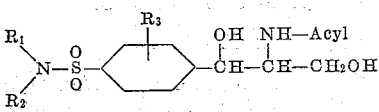

is obtained.

8. A process which comprises mixing (dl)-threo - 1 - (p - fluorosulfonylphenyl) - 2 - (alpha,alpha - dichloroacetamido) - 1,3 - propanediol with ammonia, whereby (dl)-threo-1-(p-sulfamylphenyl) - 2 - (alpha,alpha - dichloroacetamido)-1,3-propanediol is obtained.

References Cited in the file of this patent
Steinkoff: "J. Prakt. Chem.," vol. 117, series 2 (1927), pp. 58, 59 and 71.